United States Patent [19]
Williams et al.

[11] Patent Number: 5,775,453
[45] Date of Patent: Jul. 7, 1998

[54] TRACTION CONTROL SYSTEM AND METHOD FOR HYDRAULICALLY PROPELLED VEHICLES

[75] Inventors: Keith R. Williams, Minnetonka; Lynn T. Jansen, Blain, both of Minn.; Lon A. Jennings, Boone, Iowa

[73] Assignee: Sauer Inc., Ames, Iowa

[21] Appl. No.: 531,246

[22] Filed: Sep. 20, 1995

[51] Int. Cl.$^6$ .................................................. B60T 8/66
[52] U.S. Cl. ................................. 180/197; 180/307
[58] Field of Search ................... 180/197, 305, 180/307, 308, 242; 701/71

[56] References Cited

U.S. PATENT DOCUMENTS

| | | | |
|---|---|---|---|
| 3,819,004 | 6/1974 | Adde | 180/197 |
| 4,116,294 | 9/1978 | Johnston . | |
| 4,399,886 | 8/1983 | Pollman . | |
| 4,402,377 | 9/1983 | Brooks et al. . | |
| 5,043,896 | 8/1991 | Sol | 180/197 |
| 5,168,953 | 12/1992 | Naito | 180/197 |
| 5,199,525 | 4/1993 | Schueler . | |
| 5,201,570 | 4/1993 | Heren et al. . | |
| 5,390,116 | 2/1995 | Hayafune | 180/197 |
| 5,471,386 | 11/1995 | Hrovat et al. | 180/197 |
| 5,517,414 | 5/1996 | Hrovat | 180/197 |

FOREIGN PATENT DOCUMENTS

3727690 C2  2/1989  Germany .

OTHER PUBLICATIONS

Reinhard Vonnoe, Apr. 14, 1992, Programmgesteuerte und-geregelte hydrostatische Mobilantriebe, pp. 206–208, 211–212, 214, 218, 221; O + P Othydraulik und Pneumatik 36 (1992) Nr.4.

*Primary Examiner*—Brian L. Johnson
*Assistant Examiner*—Avraham Lerner
*Attorney, Agent, or Firm*—Zarley, McKee, Thomte, Voorhees, & Sease

[57] ABSTRACT

A traction control system used to control a hydraulically propelled vehicle having front and rear drive assemblies has a variable displacement hydraulic motor coupled to each drive assembly. The hydraulic motors are connected in parallel to a pump. A control system senses the speed and direction of each motor as well as the grade of the ground surface. The controller uses this data to control the front and rear hydraulic motors. If the controller determines that one of the drive axles is slipping, it will destroke that axle's motor. However, if the vehicle is traveling downhill, the downhill drive assembly will not be destroked.

11 Claims, 4 Drawing Sheets

TRACTION CONTROL SYSTEM AND METHOD FOR HYDRAULICALLY PROPELLED VEHICLES

BACKGROUND OF THE INVENTION

1. Field of the Invention

The present invention relates to hydraulically propelled vehicles. More particularly, the present invention relates to traction control systems for hydraulically propelled vehicles.

2. Problems in the Art

Typical prior art hydraulically propelled vehicles use flow dividers to split the flow between hydraulic motors being driven in parallel by the same hydraulic pump. These systems require a constant pressure drop across the flow divider to maintain the proper flow split between the motors. This results in a horsepower loss during all propel operations of the vehicle which increases engine and fuel requirements. Also, during conditions of wheel slip on one motor the flow divider can cause a very high pressure drop with accompanying heat generation and power loss. The adjustment of the flow divider to obtain the proper flow split between the motors is critical in order to maintain the lowest possible pressure drop across the flow divider valve and to keep all motors running at acceptable speeds.

On hydraulically propelled vehicles which use separate pump-motor systems to drive separate axles, the wheels must be matched to keep the speeds approximately the same at each wheel regardless of the drive ratio or the wheel rolling radius. Pressures in the separate loops may be different resulting in one or more wheels not providing a fair share of the load. This increases the tractive effort required by the faster wheels to make up for the slower wheels. Also, this does not allow the wheel to increase slip in order to increase traction in poor soil conditions.

Prior art traction control systems also have shortcomings under steep grade conditions. When traveling down a steep grade at slow speeds, the uphill axle may be at a very slow speed while the downhill axle is at a greater speed. This may be thought to be a slipping condition since the downhill axle is at a faster speed than the uphill axle. Compensating for the slipping condition may result in a reduction of traction at that end of the vehicle. This results in a speeding up of the downhill axle, and therefore the vehicle, which may further indicate a slipping condition. The effect is an uncontrolled vehicle running downhill with little hydraulic braking applied through the hydraulic propel system.

FEATURES OF THE INVENTION

A general feature of the present invention is the provision of a traction control system for hydraulically propelled vehicles.

A further feature of the present invention is the provision of a traction control system for hydraulically propelled vehicles which uses variable hydraulic motors to control the traction or slip of separate wheels, axles or tracks.

A further feature of the present invention is the provision of a traction control system for hydraulically propelled vehicles which uses sensors to sense the speed and direction of each variable motor.

A further feature of the present invention is the provision of a traction control system for hydraulically propelled vehicles having a controller that uses the difference between the speeds of each motor to determine when slipping has occurred.

A further feature of the present invention is the provision of a traction control system for hydraulically propelled vehicles which uses a controller to control the displacement of the variable motors in order to control the traction or slip of separate wheels, axles or tracks.

A further feature of the present invention is the provision of a traction control system for hydraulically propelled vehicles which includes a grade sensor to sense the grade of the ground surface over which the vehicles are positioned.

A further feature of the present invention is the provision of a traction control system for hydraulically propelled vehicles having a controller which controls the variable motors based on the speed of the motors and the grade of the ground surface.

A further feature of the present invention is the provision of a traction control system for hydraulically propelled vehicles having a grade sensor to let the controller known when a motor should not be destroked to provide maximum braking torque on steep grades.

A further feature of the present invention is the provision of a traction control system for hydraulically propelled vehicles having a grade sensor to limit unwanted destroke of a downhill motor when traveling up a steep grade and to prevent unwanted destroke of a downhill motor when traveling down a steep grade or sitting stationary on a steep grade.

A further feature of the present invention is the provision of a traction control system for hydraulically propelled vehicles having a direction sensor to modify the function of the grade sensor and motor destroke curve.

These as well as other features of the present invention will become apparent from the following specification and claims.

SUMMARY OF THE INVENTION

The traction control system of the present invention is used to control a hydraulically propelled vehicle. The control system is preferably used on a vehicle having front and rear drive assemblies including variable speed hydraulic motors for driving each assembly. The hydraulic motors are connected in parallel to a pump. The two hydraulic motors are each controlled by displacement control valves which are each controlled by a microcontroller. A pulse pick up is coupled to each of the hydraulic motors for sensing the speed and direction of the hydraulic motors. A grade sensing switch is used to determine the grade of the ground over which the vehicle travels. The control valves, pulse pick ups, and grade sensor are all connected to the microcontroller. The controller controls the hydraulic motors based on the sensed speeds, directions, and grade.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
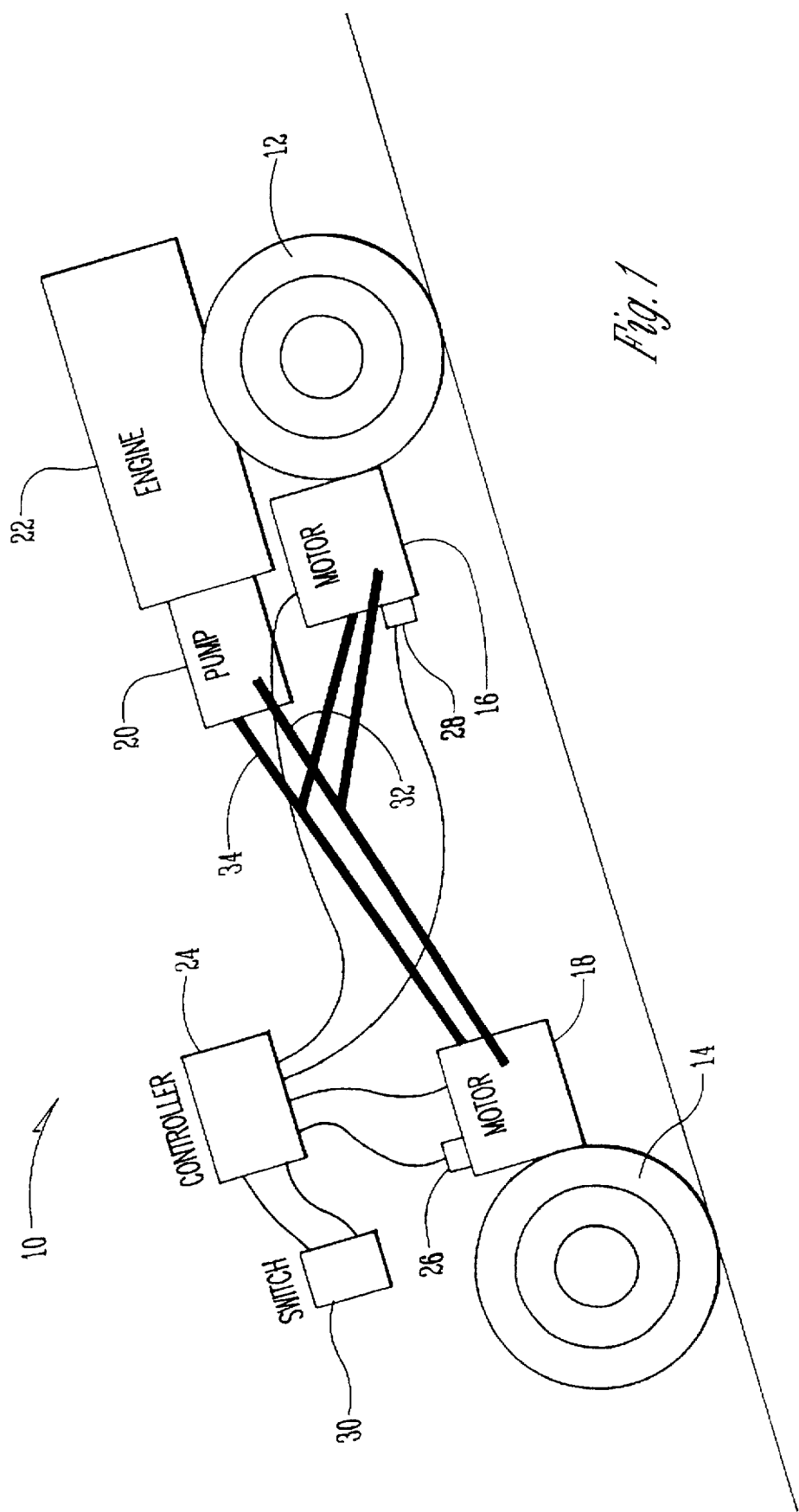
FIG. 1 is a diagram showing the configuration of one embodiment of the present invention as applied to a two axle vehicle.

FIG. 1 is a diagram showing a preferred embodiment of the traction control system of the present invention. The traction control system 10 is used on hydraulically propelled vehicles. The vehicles can be driven with a hydraulic motor on each axle or on each individual wheel. For the purposes of this description, wheels are considered to include other devices such as tracks, etc.

FIG. 1 shows a vehicle having two axles corresponding to front wheel 12 and rear wheel 14. Two electrically controlled variable motors 16 and 18 drive front and rear wheels 12 and 14, respectively. Each motor 16 and 18 is hydraulically driven by pump 20 which is driven by prime mover 22. The front and rear motors 16 and 18 are connected to a micro controller 24. Pulse pickups 26 and 28 are also connected to controller 24 and are coupled to each motor for sensing the speed and direction of each motor. Controller 24 is capable of using pulse pickups 26 and 28 for measuring the speeds of motors 16 and 18, comparing their relative speeds, and outputting a control signal to control the displacement of variable motors 16 and 18. System 10 also includes grade sensor or uphill/downhill switch 30 to inform the controller when the grade of the vehicle is above a predetermined level and which end of the vehicle is uphill on such a grade.

Figure 2:
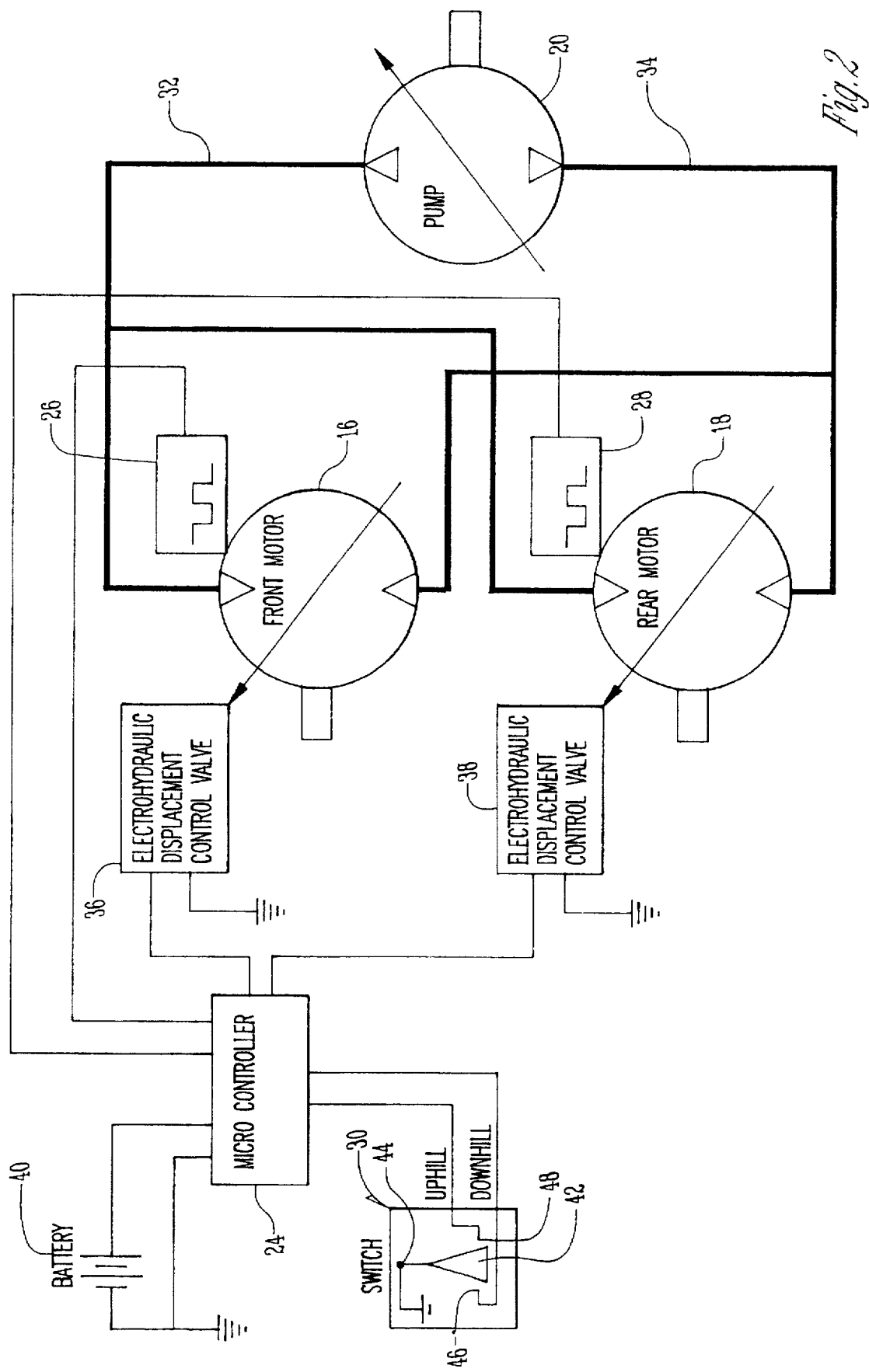
FIG. 2 is a hydraulic schematic of the embodiment shown in FIG. 1.

FIG. 2 is a hydraulic schematic diagram of the embodiment shown in FIG. 1. FIG. 2 includes hydraulic pump 20 with hydraulic lines 32 and 34 connecting front and rear motors 16 and 18 in parallel. FIG. 2 also shows pulse pickups 26 and 28, controller 24, and uphill/downhill switch 30 as discussed above. FIG. 2 also shows electrohydraulic displacement control valves 36 and 38 as well as battery 40 which provides power to controller 24. Valves 36 and 38 control the displacement of motors 16 and 18 based on control signals from controller 24.

Figure 3:
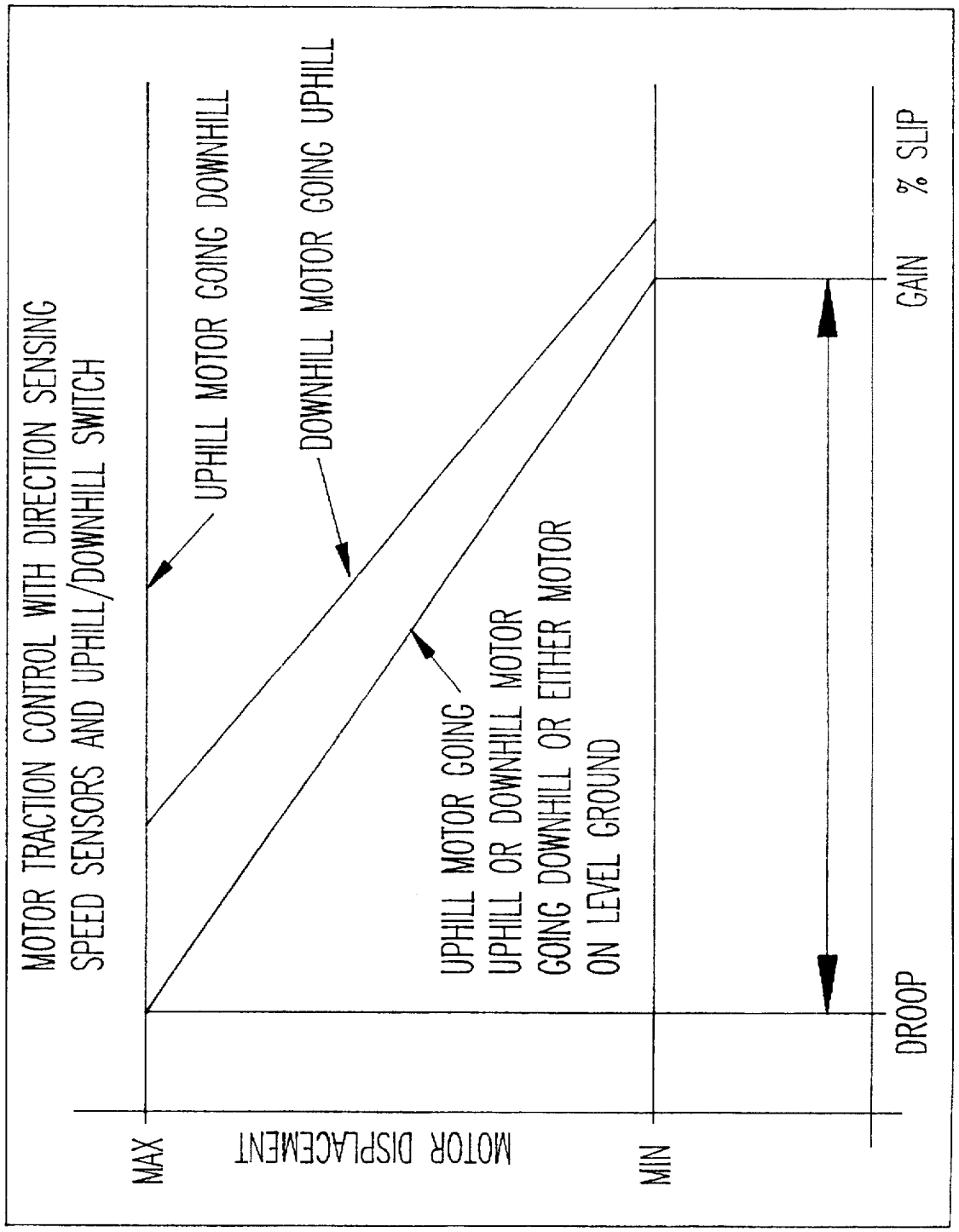
FIG. 3 shows the motor displacements under the three different conditions the vehicles and motors can be under.

Pulse pickups 26 and 28 also sense the direction of rotation of motors 16 and 18 and send a signal to controller 24 via a digital connection to controller 24. This information is used by controller 24 along with the output of uphill/downhill switch 30 to allow destroking of the downhill motor when the vehicle is moving up a steep grade but not when traveling down a steep grade. This provides the maximum braking traction when going down a hill either forward or backward while still allowing traction control when going up a hill either forward or backward. It is possible to have a condition when traveling up a hill where the downhill motor is slipping and the uphill motor is not slipping. Controller 24 can modify the destroke curve further by changing the gain and droop deadband for destroking the downhill motor as a function of the percentage of wheel slip. FIG. 3 shows the desired motor displacements under the three different conditions the vehicle and motors can be under.

Controller 24 receives signals from pulse pickups 26 and 28 indicating the rotational speeds of motors 16 and 18. Along with the vehicle's known drive ratio and drive radius for each wheel 12 and 14, controller 24 uses the rotational speed of the motors and calculates the resulting linear speed at the point of contact between wheels 12 and 14 and the ground. Wheel slip is calculated based upon the difference between the calculated linear ground speeds of motors 16 and 18. The motor turning the wheel with the faster calculated ground speed (not necessarily the fastest angular motor speed due to differences in final drive ratios and wheel radii) is assumed to be slipping and is destroked via control valve 36 or 38. The motor is destroked by an amount which attempts to maintain close to the same flow split between the motors prior to the detected wheel slip condition. The lower motor displacement reduces the tractive effort at the corresponding wheel to the point at which the output torque matches the tractive effort required to maintain the speed of the slipping wheel in contact with the ground. The pressure in the hydraulic system will increase, resulting in increased tractive effort at the non-slipping motor due to increased hydraulic torque.

While braking at slow speeds down a steep grade the uphill motor could slip and turn slower than the downhill motor. As a result, the control system would think that the downhill motor was slipping since it would be turning faster than the uphill motor. Controller 24 would then destroke the downhill motor reducing the hydraulic braking of the hydraulic propelling system. As a result, the vehicle would speed up and go downhill faster and faster as the calculated slip increased and the controller destroked the downhill motor to its minimum displacement position. To solve this problem, the present invention uses uphill/downhill switch 30 to sense the grade of the ground surface. If the condition previously described occurs, and the uphill/downhill switch 30 indicates that the vehicle is traveling downhill, then controller 24 will not destroke the downhill motor.

As illustrated in FIG. 2, uphill/downhill switch 30 is comprised of magnet 42 mounted on the end of a pendulum about pivot point 44 with two hall effect sensor switches 46 and 48 mounted about the magnet's radius of travel at the angles at which the switches are designed to activate. Switches 46 and 48 are wired so that both switches are open when the vehicle is on level ground. When the vehicle is on a slope exceeding a 7° uphill grade, uphill switch 48 is closed by the magnet moving over that switch. This drops the voltage at the controller on the uphill digital input line. As the grade is reduced magnet 42 moves away from the switch reopening the switch and thus raising the voltage in the uphill digital line. When the vehicle is on a slope exceeding a 7° downhill grade, downhill switch 46 is closed by magnet 42 moving over that switch. The voltage on the downhill digital input line is then dropped. Controller 24 thus uses the signals from uphill/downhill switch 30 as indicators when not to destroke the downhill motor. Mechanical stops prevent magnet 42 from continuing to move away from the switch as steeper grades are encountered thereby preventing the switch from reopening.

Controller 24 must be programmed to know the drive ratio between the motor and the wheel and the drive radius of the wheel being driven by the motor. This information is used to calculate the linear speed of the ground contacting drive wheel from the angular speed of the motor sensed by pulse pickups 28 and 30. Controller 24 can then calculate the wheel slip as a percentage of the difference in the two calculated linear speeds (for the front and rear wheels) divided by the faster calculated linear speed.

Two other pieces of information are required by controller 24 to control the variable motors properly. These are the threshold current at which the motor control starts to destroke the motor and the maximum electronic displacement control (EDC) current at which the variable motor reaches the destroke mechanical limit (see FIG. 4). These parameters will vary from motor to motor. As discussed previously, the wheel slip % is used to determine how much destroking of the motor is to be demanded. Typically, the relationship between the motor displacement and the control current is not linear. Therefore, a non-linear curve is required by controller 24 to ensure satisfactory control of the traction output by the motor. To determine the threshold current, maximum current, and the curve between the EDC current and motor displacement, controller 24 is calibrated. To calibrate controller 24 one motor at a time, the motor being calibrated must have the corresponding drive wheel off the ground and the other wheels blocked to prevent all motion. Pump 20 is stroked slightly so the motor turns at about 900–1000 rpm. Leaving the pump control alone, the controller calibration procedure is started and the motor EDC current is raised slowly at 1 milliAmp/second from 0 to 120 milliAmps then returned to 0 at the same rate. Controller 24 records the increase and decrease in speed as the current level is increased and decreased. The change in speed is directly proportional to the inverse of the change in displacement. By internally recording the curves, the threshold, max current, and the shape of the curve can be programmed into controller 24. The curve shape is generally the same from motor to motor of the same type while the threshold current and maximum current change from motor to motor.

Figure 4:
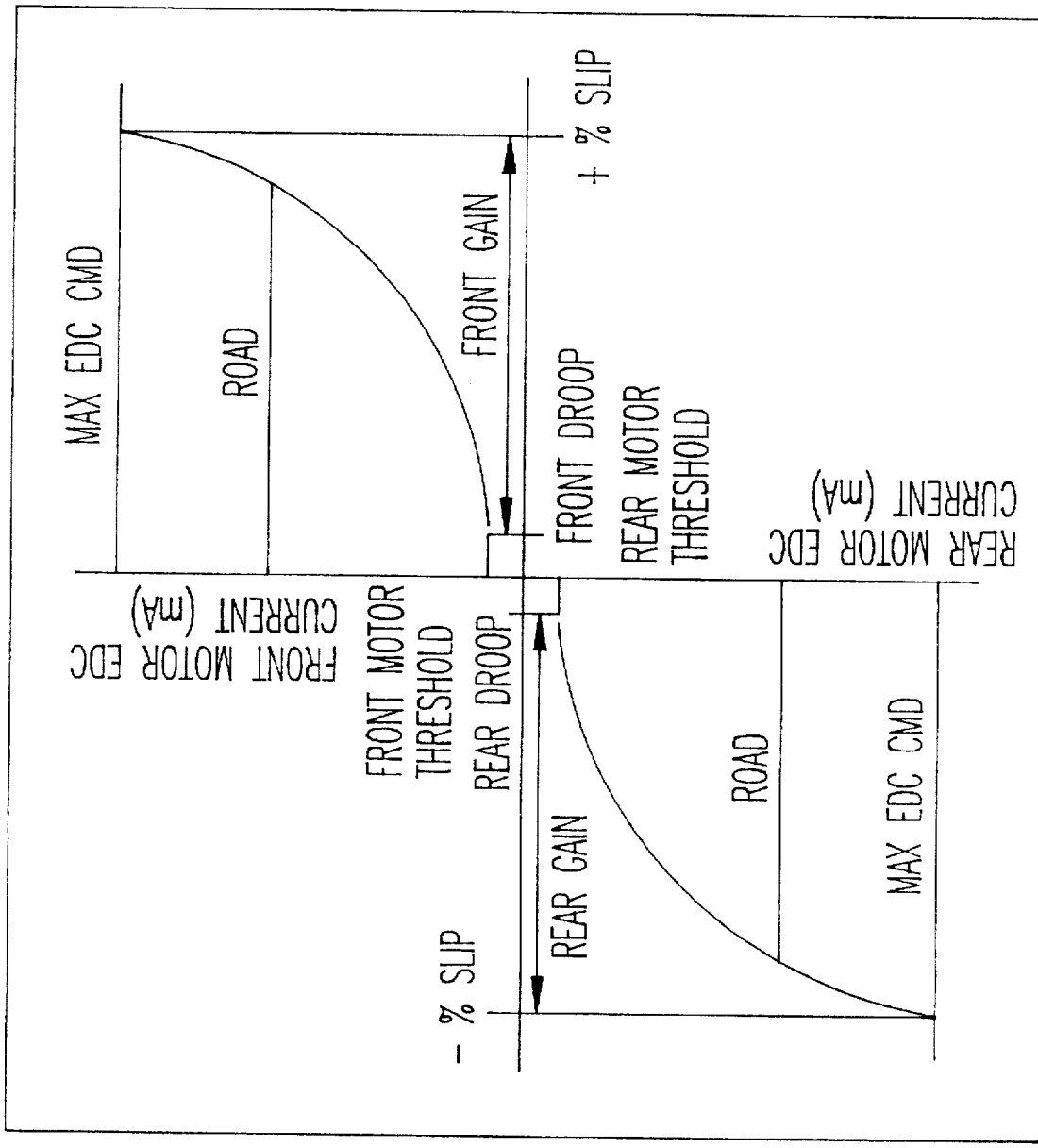
FIG. 4 is a graph showing the relationship of droop, gain, threshold, current and maximum current to slip percentage.

For each motor, the relationship between wheel slip % and motor displacement has been determined by the calibration procedure described above. A droop in wheel slip is defined as that region of small wheel slip % where the motor displacement is left at maximum (FIGS. 3 and 4). The gain is defined as the amount of wheel slip % over which the motor is destroked from maximum to minimum displacement (FIGS. 3 and 4). A droop of 5% is adequate to limit unnecessary destroking of motors due to ground conditions and slight variations of motor speed measurements on flat level hard ground where slipping typically does not occur. A gain of 50% provides the best traction control. The best gain value is determined by the fact that smaller gains cause the vehicle to speed up because more flow than desired goes to the non-slipping motor since the slipping motor is destroked too much. Also, the gradeability of the machine is lower due to the higher pressure resulting in the hydraulic loop from smaller than necessary displacements. Larger gain values are less stable resulting in stop and go wheel action. Faster wheel slip speeds also reduce the gradeability of the machine. FIG. 4 graphically shows the relationship of droop, gain, threshold current, and maximum current to slip %.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A traction control system in combination with a hydraulically propelled vehicle having front and rear drive assemblies comprising:

a variable speed hydraulic motor coupled to each of the front and rear drive assemblies;

a pulse pickup operatively coupled to each drive assembly for sensing the speed and direction of each drive assembly;

a grade sensor for sensing the grade of a ground surface; and a controller electrically operatively connected to each variable speed hydraulic motor, each pulse pickup, and the grade sensor to control the motors based on the sensed speeds, the sensed directions, and the sensed grade, wherein the controller controls the motors such that if one of the motors is determined to be slipping, the slipping motor is selectively destroked unless the vehicle is traveling downhill and the slipping motor is farther downhill than the other motor.

2. The traction control system of claim 1 wherein the controller uses the pulse pick ups to compare the speeds of each drive assembly to determine whether one of the drive assemblies is slipping.

3. The traction control system of claim 1 wherein the controller determines a calculated linear for each drive assembly based on the sensed speed of each drive assembly, and wherein the controller controls the motors based on the difference between the calculated linear speeds, the sensed directions, and the sensed grade.

4. A method of controlling a hydraulically propelled vehicle having a plurality of drive members comprising the steps of:

providing a plurality of variable speed motors each driving at least one drive member;

sensing the speed and direction of each motor;

sensing the grade of a ground surface; and controlling the variable speed motors based on the sensed speed, direction, and grade, wherein the controller controls the variable speed motors such that if one of the motors is determined to be slipping, the slipping motor is selectively destroked unless the vehicle is traveling downhill and the slipping motor is farther downhill than the other motor.

5. The method of claim 4 further comprising the steps of:

comparing the speeds of each motor;

determining if the speed of one motor is greater than the speed of another motor to determine if one of the drive members is slipping; and destroking the motor driving the slipping drive member.

6. The method of claim 4 further comprising the step of providing a pulse pick up to sense the speed and direction of each motor.

7. A method of controlling a hydraulically propelled vehicle having front and rear variable speed motors each coupled to a drive member comprising the steps of:

determining the speed and direction of each variable speed motor;

determining whether the vehicle is traveling uphill or downhill;

comparing the speed of each motor to determine whether one of the motors is slipping; and destroking the slipping motor unless the vehicle is traveling downhill and the slipping motor is the motor which is farther downhill than the other motor.

8. A traction control system in combination with a hydraulically propelled vehicle having front and rear drive assemblies comprising:

a variable speed hydraulic motor coupled to each of the front and rear drive assemblies;

a pulse pickup operatively coupled to each drive assembly for sensing the speed and direction of each drive assembly;

a grade sensor for sensing the grade of a ground surface;

a controller electrically operatively connected to each variable speed hydraulic motor, each pulse pickup, and the grade sensor, wherein the controller controls the motors based on the sensed speeds, the sensed directions, and the sensed grade, and wherein the controller uses the pulse pick ups to compare the speeds of each drive assembly to determine whether one of the drive assemblies is slipping; and wherein the controller destrokes the motor driving the slipping drive assembly unless the vehicle is traveling downhill and the slipping drive assembly is the drive assembly which is farther downhill than the other drive assembly.

9. The traction control system of claim 8 wherein the controller determines a calculated linear speed for each drive assembly based on the sensed speed of each drive assembly, and wherein the controller controls the motors based on the difference between the calculated linear speeds, the sensed directions, and the sensed grade.

10. The method of claim 9 further comprising the step of providing a pulse pick up to sense the speed and direction of each motor.

11. A method of controlling a hydraulically propelled vehicle having a plurality of drive members comprising the steps of:

providing a plurality of variable speed motors each driving at least one drive member;

sensing the speed and direction of each motor;

sensing the grade of a ground surface;

comparing the speeds of each motor;

determining if the speed of one motor is greater than the speed of another motor to determine if one of the drive members is slipping;

determining if the vehicle is traveling downhill; and destroking the motor driving the slipping drive member unless: the vehicle is traveling downhill, and the drive member which is farther downhill than any other drive member is the slipping drive member.

* * * * *

UNITED STATES PATENT AND TRADEMARK OFFICE
CERTIFICATE OF CORRECTION

PATENT NO. : 5,775,453
DATED : July 7, 1998
INVENTOR(S) : Keith R. Williams, T. Jansen and A. Jennings It is certified that error appears in the above-identified patent and that said Letters Patent is hereby corrected as shown below:

Column 6, line 11, after the word "linear" insert - speed -.

Column 7, line 15, cancel "9" and insert - 11 -.

Signed and Sealed this

Twenty-second Day of September, 1998

Attest:

BRUCE LEHMAN

Attesting Officer     *Commissioner of Patents and Trademarks*